US008451570B2

(12) United States Patent
Yelgin (10) Patent No.: US 8,451,570 B2
(45) Date of Patent: May 28, 2013

(54) METHOD FOR PRODUCTION OF AN OSCILLATING SIGNAL AND OF AN ELECTRICAL PROTECTION DEVICE OR MEASUREMENT INSTRUMENT HAVING AN OSCILLATION IDENTIFICATION DEVICE

(75) Inventor: Yilmaz Yelgin, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 13/001,451

(22) PCT Filed: Jan. 26, 2008

(86) PCT No.: PCT/EP2008/005440
§ 371 (c)(1),
(2), (4) Date: Dec. 27, 2010

(87) PCT Pub. No.: WO2009/155953
PCT Pub. Date: Dec. 30, 2009

(65) Prior Publication Data
US 2011/0102952 A1    May 5, 2011

(51) Int. Cl.
*H02H 9/00* (2006.01)
(52) U.S. Cl.
USPC .......................................................... 361/80
(58) Field of Classification Search
USPC .......................................................... 361/80
See application file for complete search history.

(56) References Cited

U.S. PATENT DOCUMENTS

| 5,731,943 | A  | * | 3/1998  | Roberts et al. ................... 361/80 |
| 6,104,182 | A  | * | 8/2000  | Jurisch et al. ................... 324/142 |
| 6,898,536 | B2 | * | 5/2005  | Wiener et al. ................... 702/75 |
| 7,457,088 | B2 | * | 11/2008 | Hou et al. ........................ 361/80 |
| 2006/0067095 | A1 |  | 3/2006 | Hou et al. |

FOREIGN PATENT DOCUMENTS

| DE | 41 00 646 A1 |   | 9/1992 |
| DE | 4100646 A1 | * | 9/1992 |
| EP | 0 724 319 A2 |   | 7/1996 |
| EP | 0 724 320 A2 |   | 7/1996 |
| EP | 724319 A2 | * | 7/1996 |
| EP | 724320 A2 | * | 7/1996 |
| EP | 0 783 197 A1 |   | 7/1997 |

OTHER PUBLICATIONS

"SIPROTEC Distance Protection 7SA6 V4.3 Manual", 2002, pp. 110-115, Siemens AG Order No. C53000-G1100-C156-3.*
Mechraoui, et al., "A New Blocking Principle With Phase and Earth Fault Detection During Fast Power Swings for Distance Protection", IEEE Transactions on Power Delivery, Jul. 1995, pp. 1242-1248, vol. 10, No. 3, IEEE Service Center, New York, NY, USA.

* cited by examiner

*Primary Examiner* — Jared Fureman
*Assistant Examiner* — Kevin J Comber
(74) *Attorney, Agent, or Firm* — Laurence A. Greenberg; Werner H. Stemer; Ralph E. Locher (57) ABSTRACT

A method for producing an oscillation signal which indicates oscillation in an electrical power supply system, in which measured values that characterize current and voltage at a measurement point in the electrical power supply system are detected and are converted to digital current and voltage vector measured values. Impedance values are calculated in the complex numerical domain from the current vector measured values and the voltage vector measured values. A curve profile formed by the impedance values is considered and, if appropriate, the oscillation signal is produced using characteristic properties of the curve profile. In order to provide a method in which an oscillation can be identified as reliably as possible, a first oscillation supposition signal is produced when the separation of the impedance values from an oscillation center point remains substantially the same and a second oscillation supposition signal is produced when the rate at which the impedance values approach the curve profile remains substantially the same. The oscillation signal is produced when both the first and the second oscillation supposition signal are present. A protective device or measurement instrument has a corresponding oscillation identification device.

16 Claims, 10 Drawing Sheets

METHOD FOR PRODUCTION OF AN OSCILLATING SIGNAL AND OF AN ELECTRICAL PROTECTION DEVICE OR MEASUREMENT INSTRUMENT HAVING AN OSCILLATION IDENTIFICATION DEVICE

Method for production of an oscillating signal and of an electrical protection device or measurement instrument having an oscillation identification device

BACKGROUND OF THE INVENTION

Field of the Invention

The invention relates to a method for production of an oscillating signal which indicates an oscillation in an electrical power supply system, in which measured values which characterize the current and voltage at a measurement point in the electrical power supply system are detected and are converted to digital current and voltage vector measured values; and impedance values, which lie on the complex number plane, are calculated from the current vector measured values and the voltage vector measured values. A curve profile which is formed by the impedance values is considered, and the oscillating signal is produced using characteristic properties of the curve profile. The invention also relates to an electrical protection device or measurement instrument having an oscillation identification device.

Electrical power supply systems are normally monitored in sections by so-called protection devices for impermissible operating states, such as shorts or ground faults. When an impermissible operating state such as this occurs, these protection devices separate that part of the power supply system which is affected by the fault from the rest of the system by opening appropriate circuit breakers, therefore preventing a danger to personnel and components in the electrical power supply system. The protection devices carry out so-called protection algorithms in order to monitor the individual sections of the electrical power supply system. In this case, the measured values which, for example, may be measured values which characterize the current and the voltage at a measurement point in the electrical power supply system, are used to decide whether an impermissible or a permissible operating state is present.

One protection algorithm which is frequently used for this purpose operates on the basis of the so-called distance protection method, in which impedance values which lie on a complex number plane are calculated from current and voltage measured values, and are checked to determine whether the impedance values lie within a predetermined range—which is also referred to as the tripping polygon. If the impedance values lie within this predetermined range, the distance protection device detects an impermissible operating state on the section of the electrical power supply system being monitored by it, and sends a tripping signal to one or more circuit breakers, which bound the section, in order to isolate the faulty section from the rest of the power supply system.

In the event of sudden load changes or changes to the structure of the electrical power supply system (for example by relatively large parts of the system being connected or disconnected), so-called oscillation processes or system oscillations can occur in the electrical power supply system, which will be referred to for the sake of simplicity in the following text as "oscillations", since the generators must be adjusted to the new load situation at the feed points of the electrical power supply system. This is normally in the form of a damped oscillation until the new operating point of the electrical power supply system has been stabilized. During an oscillation, the current and voltage oscillate, so to speak, between high and low values along the power supply lines. In the case of an oscillation, it is therefore frequently possible for an electrical distance protection device to measure low voltages with high currents at the same time at its measurement point and, from them, to calculate low impedance values which lie within a tripping polynomial. Since a damped oscillation—which is also referred to as being synchronous—normally, however, does not describe a dangerous operating state of the electrical power supply system, tripping should not take place in a situation such as this. If the distance protection function were to be applied simply, the distance protection device would, however, identify an impermissible operating state, and would disconnect the monitored section of the electrical power supply system. This can result in inadvertent spurious disconnections of certain parts of the electrical power supply system, these disconnections are normally associated with high costs for the operator of the electrical power supply system. Furthermore, the sudden change in the system structure as a result of the spurious disconnection can result in overloading of sections of the electrical power supply system which are still connected, which can lead to cascading disconnections, or even to a so-called blackout.

For the sake of completeness, it should be mentioned at this point that the invention which will be described later can be used not only for identification of synchronous oscillations but also for identification of so-called asynchronous oscillations, in which the oscillation passes through the entire impedance path curve. The term "oscillations" should therefore be understood in this sense (synchronous or asynchronous) in the following text.

In order to avoid inadvertent spurious tripping in the event of oscillations, so-called oscillation identification devices are normally provided. When an oscillation identification device detects an oscillation, it emits an oscillation signal. This oscillation signal may, for example, be used to block the emission of a tripping signal to an electrical circuit breaker from a distance protection device. An oscillation identification device may in this case either be an integrated component of a distance protection device, or may be formed by a separate device which is operatively connected to a distance protection device.

Distance protection devices with integrated oscillation identification are marketed by the applicant, for example under the name "SIPROTEC 7SA6 distance protection". The corresponding devices are known from the Siemens AG equipment manual "SIPROTEC 7SA6, V4.3 distance protection" from the year 2002, Siemens AG order number C53000-G1100-C156-3. Section 2.3 of this equipment manual, "Maβ-nahmen bei Netzpendelungen" [Measures in the event of system oscillations] describes that a curve profile, which is formed by impedance values on a complex number plane, is examined for characteristic properties, such as "continuity", "monotonicity" and "sudden-change response" for oscillation identification, and an oscillation signal is produced on the basis of the examination results, if an oscillation is identified.

BRIEF SUMMARY OF THE INVENTION

The invention is based on the object of specifying an option, which can be used alternatively or in addition to the known method, for reliable identification of an oscillation in a power supply system.

According to the invention, this object is achieved by a method of the type mentioned initially in which a first oscillation suspicion signal is produced if the separation of the impedance values from an oscillation center point remains substantially constant and a second oscillation suspicion signal is produced if the rate at which the impedance values progress on the curve profile remains substantially constant. The oscillation signal is produced when both the first and the second oscillation suspicion signals are present. The method according to the invention is based on the discovery that, in the event of oscillations, a curve profile which is described by the impedance values substantially follows an elliptical profile, and has a continuous movement profile, but not a sudden movement profile. An oscillation in an electrical power supply system can therefore be identified very reliably in the described manner. By way of example, an oscillation signal may be used by an algorithm that is carried out in a protection device to decide between permissible and impermissible operating states, and/or to make this available in the form of a message to a system control center.

According to one advantageous development of the method according to the invention, in order to produce the first oscillation suspicion signal an impedance vector which originates from the oscillation center point is determined for each of the impedance values which lie on the curve profile and the magnitude of the respective impedance vector is calculated. The first oscillation suspicion signal is produced if the ratio of the magnitudes of two immediately successive impedance vectors is within a predetermined range around the value 1. This allows the first oscillation suspicion signal to be produced using comparatively simple computational means.

A further advantageous embodiment of the method according to the invention provides that in order to produce the second oscillation suspicion signal an impedance vector which originates from the oscillation center point is determined for each of the impedance values which lie on the curve profile and an angle rate is determined for the instantaneous impedance vector and the impedance vector which immediately precedes it. The second oscillation suspicion signal is produced if the difference between the angle rates is less than a predetermined rate threshold value. This allows the second oscillation suspicion signal to be produced using comparatively simple computational means.

In this context, it is also considered to be advantageous if the angle between the impedance vector being considered and the impedance vector which immediately precedes it is in each case considered in order to determine the angle rate. This is because, when current and voltage vector measurement values are produced by uniform sampling of current and voltage, the angle rate can be considered to be proportional to the angle included between two impedance vectors, as a result of which one simple angle determination is sufficient to calculate the angle rate.

A further advantageous embodiment of the method according to the invention provides that a third oscillation suspicion signal is produced if the acceleration with which the impedance values progress on the curve profile remains substantially constant. The oscillation signal is also produced when the first and the third oscillation suspicion signals are present. This allows the method according to the invention for oscillation identification to be carried out even more reliably, since oscillations which are not hazardous can occur in individual cases, in which, although the angle rate, at which an oscillation occurs, changes, this takes place, however, in a uniform manner. The second oscillation suspicion signal is therefore not present in a case such as this. However, since this change occurs in a uniform manner and the angular acceleration is therefore largely constant, the third oscillation suspicion signal is present, and the oscillation signal is produced when the first and third oscillation suspicion signals are present.

In this context, in order to reduce the computation power required to determine the third oscillation suspicion signal, it is advantageously possible to provide for the third oscillation suspicion signal to be produced only when only the first oscillation suspicion signal is present. This is because, in this situation, the criterion for the third oscillation suspicion signal is checked only if required, that is to say when the second oscillation suspicion signal is not present.

Furthermore, in this context, one advantageous embodiment of the method according to the invention provides that in order to produce the third oscillation suspicion signal, an impedance vector which originates from the oscillation center point is determined for each of the impedance values which lie on the curve profile and an angular acceleration is determined for the instantaneous impedance vector and the impedance vector which immediately precedes it. The third oscillation suspicion signal is produced when the difference between the angular accelerations is less than a predetermined acceleration threshold value. If the current and voltage are sampled uniformly, it is once again sufficient to consider only the respective included angle for determining the angular acceleration.

With regard to determining the oscillation center point, one advantageous development of the method according to the invention provides that in order to determine the oscillation center point, partial center points are in each case determined for the instantaneous impedance value and a number of impedance values which immediately precede it and those partial center points with the largest and the smallest imaginary parts are removed. The oscillation mean value is determined as the arithmetic mean from the remaining partial center points. This makes it possible to also compensate for minor discrepancies between the curve profile formed by the impedance values and an ideal elliptical profile, since the excessively large and excessively small imaginary parts, which result from the discrepancy, of the partial center points disappear from the rest of the analysis. A value of zero can be assumed, to a good approximation, for the real part of the partial center points and of the oscillation center point; therefore, the oscillation center point lies on the imaginary axis on the impedance plane.

In order to allow the center point calculation to be carried out even more accurately and reliably for this purpose, a further advantageous embodiment of the method according to the invention proposes that the oscillation center point is determined from the remaining partial center points only if the standard deviation of the distribution of the partial center points is below a predetermined plausibility threshold value.

In conjunction with the center point calculation, it is also considered to be an advantageous embodiment of the method according to the invention for the partial center points to be determined by means of a least-squares estimation method. By way of example, center point determination such as this is described in the Siemens AG German patent specification DE 19746719 C1.

A further advantageous embodiment of the method according to the invention proposes that a fourth oscillation suspicion signal is produced if the curve profile has a monotonic behavior; and the oscillation signal is produced only if the fourth oscillation suspicion signal is also present. In order to increase even further the reliability of the production of the oscillation signal, it is also possible to provide for a fifth oscillation suspicion signal to be produced if the interval between in each case two immediately successive impedance values exceeds a predetermined interval threshold value; and the oscillation signal is produced only if the fifth oscillation suspicion signal is also present. The last two measures—either jointly or in their own right—allow the oscillation signal to be produced with even greater reliability since the criteria of "monotonicity" and "continuity", which are known per se, are additionally linked to the criteria described above.

In order to allow an oscillation to be distinguished from an impermissible operating state with high reliability even when sudden changes occur in the real or imaginary parts of the impedance values, a further advantageous embodiment of the method according to the invention proposes that a first sudden-change signal is produced if a sudden change is identified between the imaginary parts of two immediately successive impedance values and a second sudden-change signal is produced if a sudden change is identified between the real parts of two immediately successive impedance values. The oscillation signal is produced if only one of the two sudden-change signals is present and, at the same time, the first and the second oscillation suspicion signals are present, or the first and the third oscillation suspicion signals are present. In contrast, the oscillation signal is not produced if both sudden-change signals are present.

A further advantageous embodiment of the method according to the invention provides that a distance protection method is also carried out using the impedance values; and the production of a tripping signal is blocked by the distance protection method when the oscillation signal is present.

In this context, one advantageous embodiment provides that when carrying out the distance protection method, the impedance values are checked to determine whether they lie within a predetermined tripping polygon and the oscillation signal is produced only if at least the instantaneous impedance value lies within an oscillation polygon which surrounds the tripping polygon. Since, in this case, the oscillation signal is produced only when at least one impedance value is located within the oscillation polygon, that it to say in the vicinity of the tripping polygon, it is possible to ensure that confusing messages relating to the occurrence of oscillation signals are avoided for the operator of a protection device with an oscillation identification function such as this, when this oscillation takes place in an operating state of the electrical power supply system which is also referred to as "load fluctuation" and which is well away from an impermissible operating state.

Finally, the object mentioned above is also achieved by an electrical protection device or measurement instrument having an oscillation identification device, which is designed to carry out one of the methods described above. In this case, the oscillation identification device may not only be integrated in an electrical distance protection device, but may also be in the form of a measurement instrument, as a separate unit.

The invention will be explained in more detail in the following text with reference to exemplary embodiments. In the figures:

DESCRIPTION OF THE INVENTION

Figure 1:
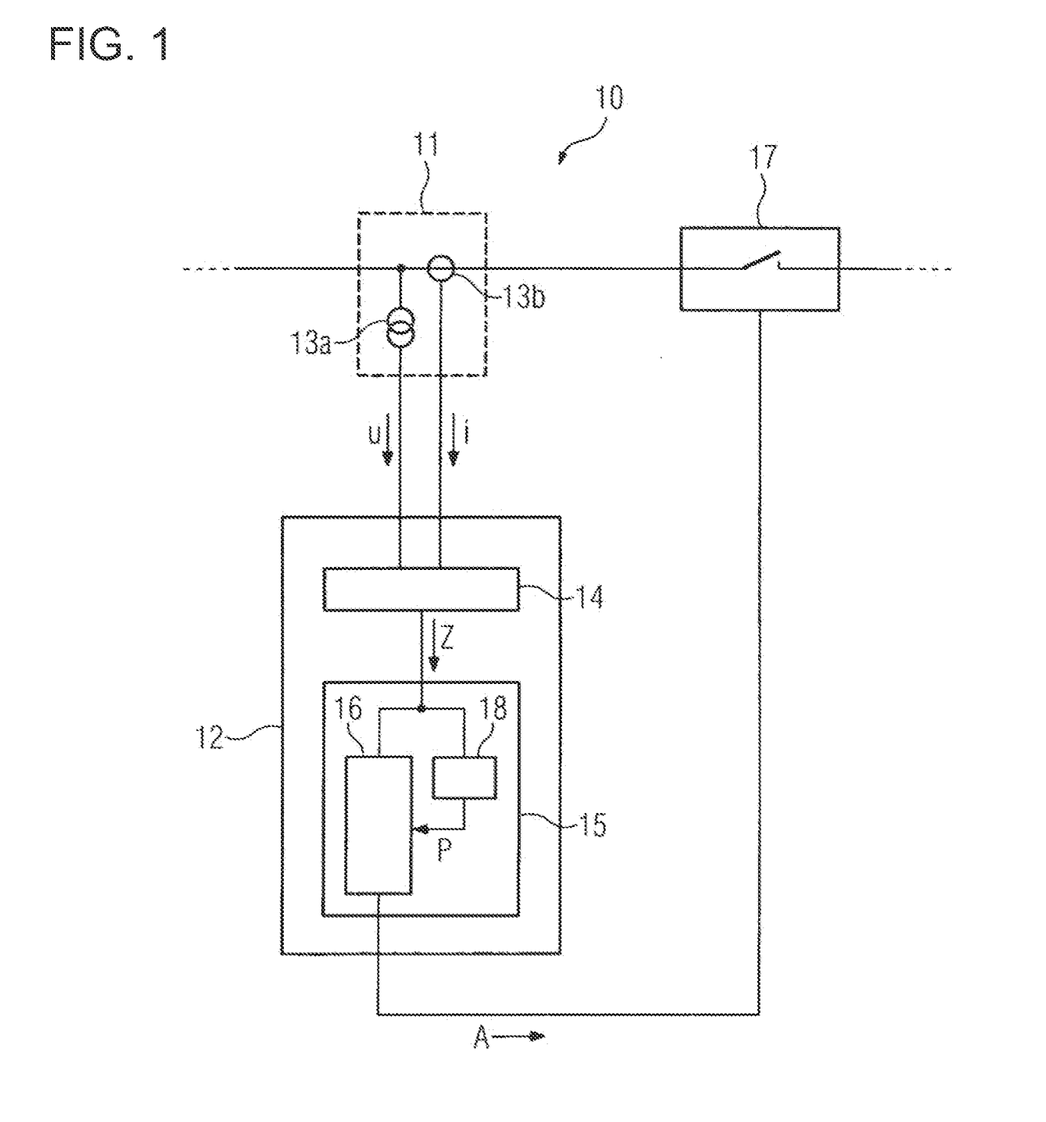
FIG. 1 shows a schematic illustration of a distance protection device, which is arranged at a measurement point in an electrical power supply system and has an integrated oscillation identification device.

FIG. 1 shows a schematic illustration of a section 10 of an electrical power supply system, which is otherwise not illustrated in any more detail. The section 10 may, for example, be a three-phase power supply line for an alternating-current power supply system. An electrical distance protection device 12 is provided at a measurement point 11 in order to monitor the section 10 for impermissible operating states, such as shorts or ground faults. Measured values which characterize the voltage and current u and i, respectively, at the measurement point 11 are detected at the measurement point 11 by voltage transformer 13a and current transformer 13b, which are only indicated schematically, and these measured values are transmitted to the distance protection device 12. The distance protection device 12 has a measured value detection and preprocessing device 14, by means of which the measured values u and i are detected, and are first of all transformed to a respective voltage and current level which is suitable for further processing within the device.

The measured values u and i are then converted from analog to digital form. Voltage vector measured values and current vector measured values are produced from the digitized measured values—for example with the aid of digital filters. These voltage and current vector measured values comprise information about the amplitude and phase angle of the measured voltage and of the measured current, respectively, at the respective measurement time, and are normally represented as vectors on the complex number plane, which is in this case also referred to as the impedance plane. Furthermore, impedance values Z are calculated from the current and voltage vector measured values in the measured value detection and preprocessing device 14, in which case the calculated impedance values Z also lie on the complex number plane, which is also referred to as the impedance plane.

The transformation to a current and voltage level which is suitable for the electrical distance protection device 12, as well as analog/digital conversion can be carried out outside the electrical distance protection device 12, as well, in contrast to the illustration shown in FIG. 1. In this case, the measured value protection and preprocessing device 14 would only have to calculate the current and voltage vectors and determine the associated impedance values Z.

The impedance values Z are transmitted to a control device 15 for the distance protection device 12. The control device 15 has a distance protection device 16 in which, on the basis of the impedance values Z, a so-called distance protection algorithm is used to decide whether a permissible or an impermissible operating state exists on the section 10 of the electrical power supply system.

Figure 2:
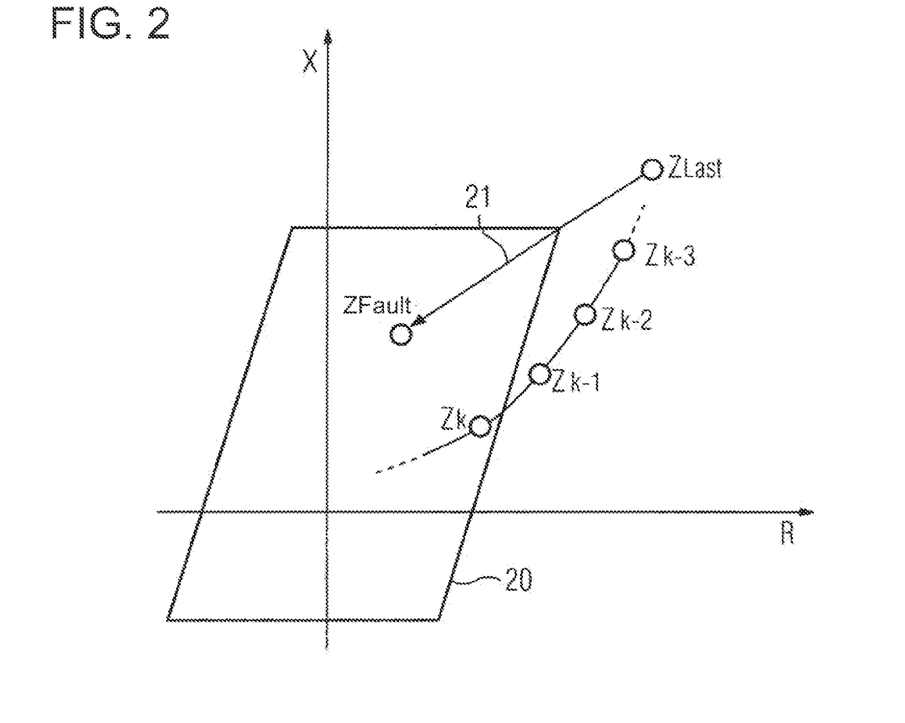
FIG. 2 shows a sequence of complex impedance values on the R-X diagram.

Reference will also be made to FIG. 2 in order to explain this process. FIG. 2 shows impedance values $Z_{load}$, $Z_{fault}$, $Z_k$, $Z_{k-1}$, $Z_{k-2}$ and $Z_{k-3}$ plotted on a so-called R-X diagram, that is to say on the complex impedance plane. These impedance values are represented using the complex representation form:

$$Z = R + jX$$

wherein the real part R denotes the so-called resistance component (the pure resistance component) and the imaginary part X the so-called reactance part (the components of the impedance caused by capacitances and inductances) of the impedance, while j denotes the imaginary number $\sqrt{-1}$.

The distance protection algorithm carried out by the distance protection device 16 checks the impedance values Z to determine whether they are within a range described by a so-called tripping polygon 20 on the R-X diagram. This tripping polygon 20 normally resides with impedances having small real and imaginary parts. This is because, in normal load situations, the operating point of the impedance $Z_{load}$ occurs relatively constantly for impedance values with comparatively higher real and imaginary parts, while when a fault such as a short occurs, the high fault current flowing at the fault point results in a sudden change, as indicated by an arrow 21, to low impedance values—represented by the impedance value $Z_{fault}$. When the distance protection device 16 (cf. FIG. 1) identifies an impermissible operating state because of the calculated impedance values being within the tripping polygon 20, then it emits a tripping signal A at an output of the electrical distance protection device 12, which tripping signal A is transmitted to a circuit breaker 17, whose switching contacts are then opened, disconnecting the section 10 from the rest of the power supply system.

When an oscillation takes place, the current and voltage oscillate and therefore, so to speak, the electrical power oscillates along a power transmission line between a plurality of generators and electrical loads in a reciprocating manner until—in the case of a damped oscillation—a stable operating point finally once again occurs. Such electrical oscillations allow impedance values to be determined at a measurement point in the electrical power supply system, which impedance values lie within the tripping polygon 20 but do not indicate an impermissible operating state, but the oscillation. In contrast to a fault situation, the impedance values $Z_{k-3}$, $Z_{k-2}$, $Z_{k-1}$, and $Z_k$ move slowly, in the case of an oscillation, from the operating point $Z_{load}$ along an approximately elliptical curve profile toward the tripping polygon 20, and finally, enter it with the impedance value $Z_K$. In a situation such as this the distance protection device should not open the associated circuit breaker, despite the impedance values lying in the tripping polygon 20. In order to avoid undesirable spurious tripping, oscillation processes must therefore be reliably identified, in order to make it possible to prevent possible tripping of the relevant circuit breakers. Algorithms for oscillation identification must therefore be designed to identify the difference between a suddenly occurring fault situation and a gradual oscillation, in order to suppress the output of a tripping signal to a circuit breaker in the event of an oscillation.

The control device 15 for the distance protection device 12 (cf. FIG. 1) therefore has an oscillation identification device 18 which uses the impedance values to check whether there is an oscillation on the section 10 of the electrical power supply system and, in the event of such an oscillation, emits an oscillation signal P to the distance protection device 16, in order to block the output of the tripping signal A there. In other words, when an oscillation is identified, no tripping signal A should be emitted since, a situation such as this does not involve an impermissible operating state on the section 10 of the electrical power supply system.

The oscillation identification device 18 may also be in the form of an external oscillation identification device, in contrast to the illustration shown in FIG. 1, that is to say it may be arranged outside the electrical distance protection device 12, and can emit an appropriate oscillation signal P to an input of an appropriate distance protection device, in order to indicate to a control device of the distance protection device that an oscillation has been identified.

Exemplary embodiments which can be used as the oscillation identification device 18 shown in FIG. 1 or as external oscillation identification devices will be dealt with at a later point, in conjunction with FIGS. 5, 6 and 8 to 10.

Figure 3:
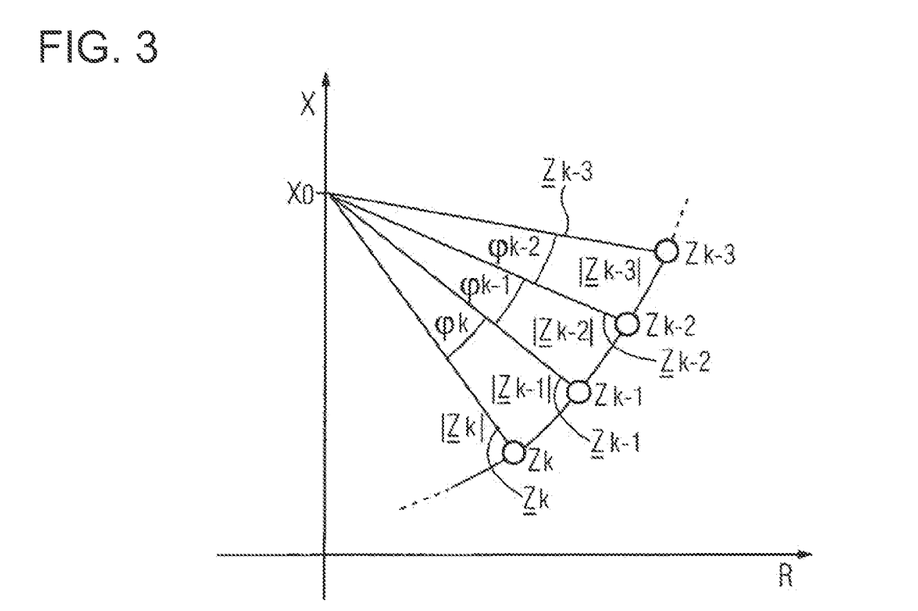
FIG. 3 shows an R-X diagram in order to explain the production of a first and a second oscillation suspicion signal.

The way in which an electrical oscillation is identified will be explained in more detail with reference to FIG. 3. FIG. 3 shows a sequence of impedance values $Z_k$, $Z_{k-1}$, $Z_{k-2}$ and $Z_{k-3}$ on the complex R-X diagram. The impedance values $Z_k$ to $Z_{k-3}$ represent only a selection of the impedance values calculated on the basis of the recorded current and voltage measured values i and u, respectively. In this case, $Z_k$ represents the instantaneously recorded impedance value, the impedance value $Z_{k-1}$ that impedance value which was previously determined one sampling clock cycle previously, that is to say the impedance value which immediately precedes the instantaneous impedance value $Z_k$. In a corresponding manner, $Z_{k-2}$ and $Z_{k-3}$ form the impedance values respectively preceding the impedance value $Z_{k-1}$.

The curve profile described by the impedance values $Z_k$ to $Z_{k-3}$ indicates an oscillation—as already illustrated in FIG. 2. First of all, a so-called oscillation center point $X_0$ is formed in order to reliably identify the oscillation, lying on the imaginary axis of the R-X diagram and forming a center point for the approximately elliptical curve profile which the impedance values $Z_k$ to $Z_{k-3}$ describe. If the separation between successive impedance values and the oscillation center point $X_0$ substantially matches, then this can be regarded as an indication that an oscillation is taking place. Specifically, the check relating to the constant separation from the oscillation center point $X_0$ can, for example, be carried out by forming impedance vectors $Z_k$, $Z_{k-1}$, $Z_{k-2}$ and $Z_{k-3}$ originating from the oscillation center point $X_0$, which have their origin at the oscillation center point $X_0$ and extend to the respective impedance value $Z_k$ to $Z_{k-3}$. If the magnitudes of successive impedance vectors approximately match, then the separation remains virtually the same.

In addition, the rate is considered at which the impedance values $Z_k$ to $Z_{k-3}$ recorded successively in time progress on the curve profile. If the rate also remains approximately constant for successive impedance values, then this can also be regarded as an indication of an oscillation. In order to determine the rate at which the impedance values $Z_k$ to $Z_{k-3}$ progress on the curve profile, it is possible, for example, to use the respective angle rate at which the respective impedance vectors $Z_k$ to $Z_{k-3}$ rotate, starting from the oscillation center point $X_0$. If this remains constant, then, if the separation from the oscillation center point $X_0$ also remains the same, the rate of the impedance values $Z_k$ to $Z_{k-3}$ on the curve profile is also constant. Angle rates which remain constant can be regarded as a further indication of electrical oscillation.

Since, when measured values i and u, respectively (cf. FIG. 1) which characterize the current and voltage are sampled with a constant sampling rate, the time interval between the respective impedance vectors $Z_k$ to $Z_{k-3}$ is always constant, the angle rate can be assumed to be proportional to the respective included angle $\phi_k$ to $\phi_{k-3}$. The angle rate of the instantaneous impedance vector $Z_k$ is therefore proportional to that angle $\phi_k$ which has been covered since the immediately preceding impedance vector $Z_{k-1}$. The angle rate associated with the impedance vector $Z_{k-1}$ is proportional to the angle $\phi_{k-1}$ which has been covered since the impedance vector $Z_{k-2}$ which immediately precedes this impedance vector $Z_{k-1}$. The further angle rates are determined in a corresponding manner.

If the time interval between the respective impedance vector, for example $Z_k$ and $Z_{k-1}$, is known, then the angle rate can also be determined explicitly by forming the quotient of the respective included angle and this time interval; however, the angle covered at a constant sampling rate is sufficient for consideration for the purposes of oscillation identification. Where the following text refers to an angle rate, this term therefore means both the expressively determined angle rate and the angle, which is proportional to this, assuming that the sampling rate is constant. A corresponding situation applies to an angular acceleration, which will be dealt with in more detail later.

The calculation of the oscillation center point $X_0$ will be explained in more detail with reference to FIG. 4. The oscillation center point $X_0$ is determined with the aid of a least-squares estimation method, for example as is described in German patent specification DE 19746719 C1, which has already been mentioned in the introduction. In this case, it is on the one hand assumed with sufficient accuracy that the oscillation center point $X_0$ always lies on the imaginary axis in the R-X diagram, which means that only its imaginary component need be determined. The oscillation center point $X_0$ is determined from a plurality of partial center points $X_0^m$. One such partial center point $X_0^m$ is obtained using the least-squares estimation method, from the following equation:

$$X_0^m = Zx_m + \frac{dZr_m}{dZx_m} \cdot Zr_m,$$

where m is the respective sampling time; Zx is the imaginary component (reactance), Zr is the real component (resistance) of the respective impedance value. The derivatives of the reactance Zx and of the resistance Zr are formed using a second-order method, using the following equations:

$dZr = Zr_m - Zr_{m-1}$ and $dZx = Zx_m - Zx_{m-1}$.

An oscillation center point $X_0$ can be formed from a plurality of partial center points, $X_0^m$ by forming the arithmetic mean value. This will be explained briefly in the following text. For this purpose, it is assumed that a respective partial center point $X_0^m$ is created for an impedance value under consideration using the abovementioned equation and in each case using the impedance value under consideration itself as well as the two impedance values preceding it. The partial center point $X_0^k$ for the instantaneous impedance value $Z_k$ is in consequence obtained by consideration of the impedance values $Z_k$, $Z_{k-1}$ and $Z_{k-2}$. The partial center point $X_0^{k-1}$ for the impedance value $Z_{k-1}$ is obtained in a corresponding manner using the impedance values $Z_{k-1}$, $Z_{k-2}$ and $Z_{k-3}$. A specific number of such partial center points $X_0^m$ are now averaged in order to determine the oscillation center point $X_0$, in which case this number of partial center points $X_0^m$ may, for example, assume the value 8 if the aim is to in each case produce the oscillation center point $X_0$ using the last 8 partial center points $X_0^m$. In this case, the oscillation center point $X_0$ for the instantaneous impedance values $Z_k$ will be determined by using the partial center points $X_0^k$ to $X_0^{k-7}$ calculated for the impedance values $Z_k$ to $Z_{k-7}$, and the arithmetic mean of these will be formed.

Since the oscillation center point $X_0$ is in each case determined only for a limited number of impedance values, a gradual shift in the center point, such as that which can occur when passing over the electrical curve profile, which is normally elliptical for oscillations, a number of times, can be appropriately taken into account, such that a center point shift such as this can be taken into account, and does not necessarily lead to the oscillation signal not being emitted.

In order nevertheless to obtain a reliable value for the oscillation center point $X_0$ for a curve profile which is slightly non-uniform, it is possible, when determining this from the individual partial center points $X_0^m$ to carry out the procedure such that that partial center point $X_0^m{}_{max}$ with the highest imaginary component and that partial center point $X_0^m{}_{min}$ with the lowest imaginary component are in each case removed, and the oscillation center point $X_0$ is then determined by using the arithmetic mean from the other partial center points $X_0^m$.

Figure 4:
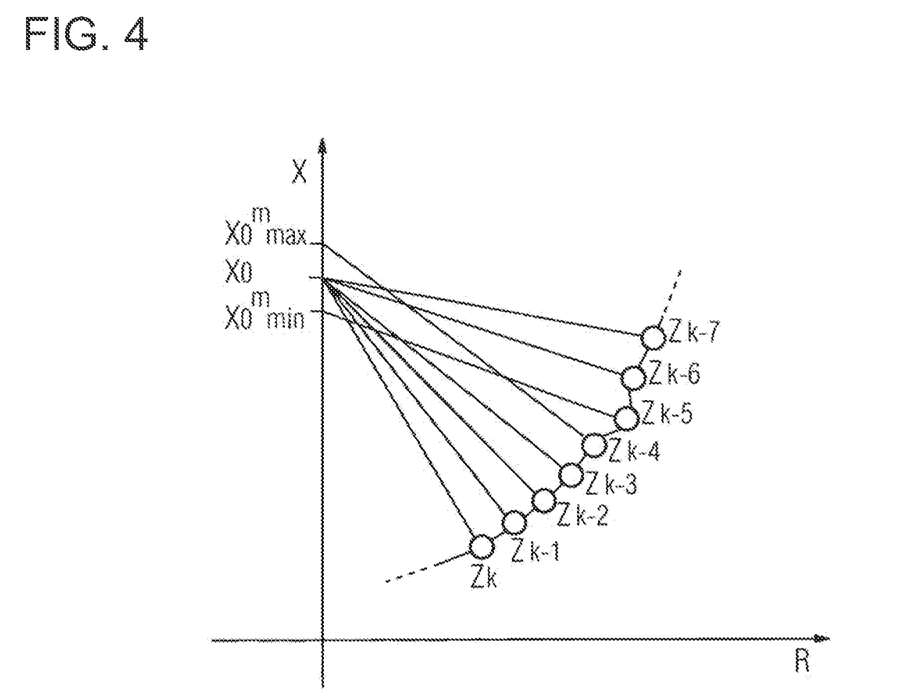
FIG. 4 shows a further R-X diagram in order to explain the determination of an oscillation center point.

As can be seen in the example in FIG. 4, the impedance value $Z_{k-5}$ is a so-called spurious value; this is because the impedance value $Z_{k-5}$ does not lie on an ideal elliptical path curve with the other impedance values $Z_k$ to $Z_{k-4}$, $Z_{k-6}$ and $Z_{k-7}$. In FIG. 4, this in each case results in corrupted partial center points $X_0^m{}_{min}$ and $X_0^m{}_{max}$ illustrated in exaggerated form, which could have a negative influence on a calculation of the oscillation center point $X_0$. Spurious values such as these are therefore compensated for by removing the largest partial center point $X_0^m{}_{max}$ and the smallest partial center point $X_0^m{}_{min}$, from the formation of the arithmetic mean values, and by using only the remaining partial center points to form the arithmetic mean for determining the oscillation center point $X_0$.

In order to prevent an oscillation center point $X_0$ being formed for a completely irregular curve profile of the impedance values, a plausibility check can also be carried out on the remaining partial center points, by checking whether any scatter of these partial center points is within a certain range. Thus, for example a standard deviation can be determined for these partial center points, with an oscillation center point $X_0$ then being calculated only if the standard deviation is less than a specific plausibility threshold value which, for example, may reside between 10% and 15%. If a plausibility check such as this fails, the partial center points are arranged with an excessive scatter. In a situation such as this, it would not be possible to calculate the oscillation center point $X_0$ with sufficient accuracy to allow a reliable statement to be made on whether an oscillation is present. Therefore, if the plausibility check fails, the oscillation center point $X_0$ calculation process is terminated and is continued when the next subsequent impedance value is detected.

Figure 5:
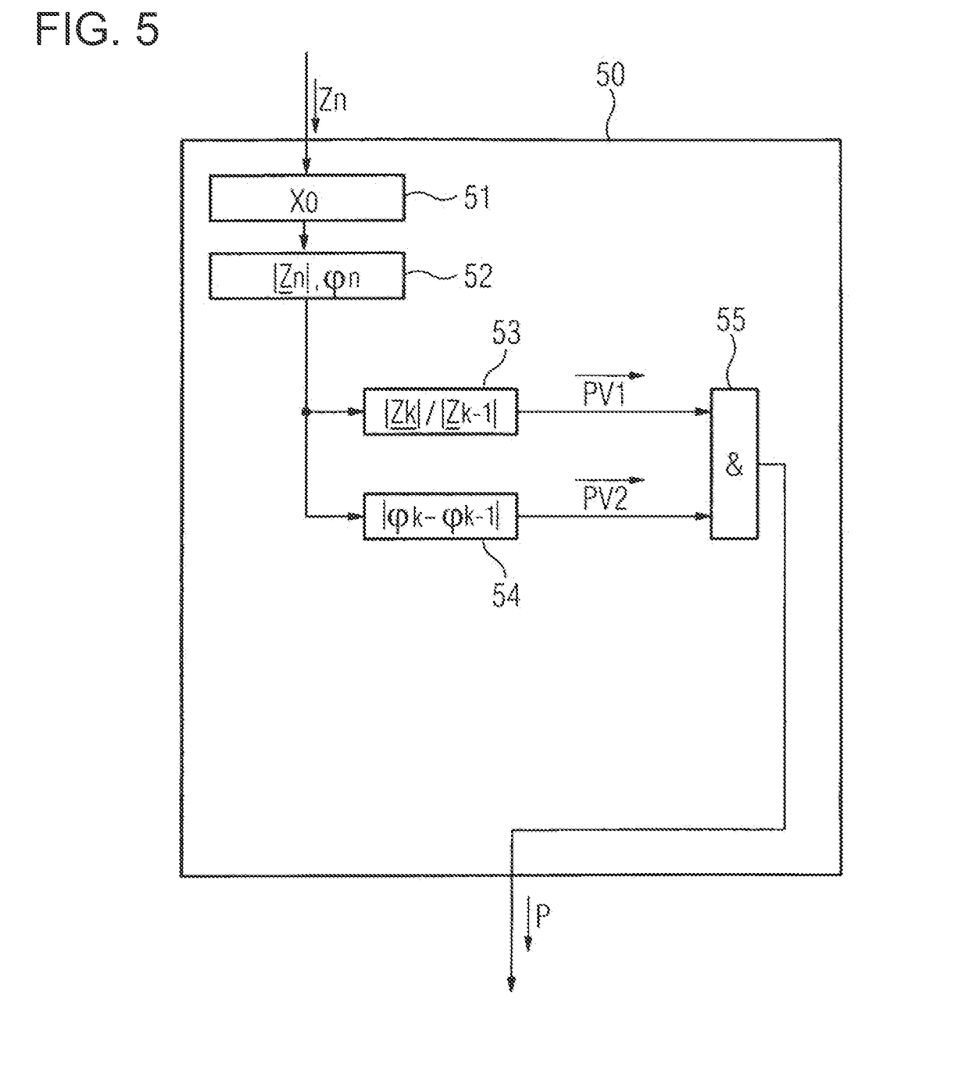
FIG. 5 shows a block diagram in order to explain a first exemplary embodiment of an oscillation identification device.

FIG. 5 shows an exemplary embodiment of an oscillation identification device 50. The oscillation identification device 50 shown in FIG. 5 uses the criteria described in conjunction with FIG. 3 to identify a curve profile which indicates oscillation.

The oscillation center point $X_0$ for the respective instantaneous impedance value $Z_n$ is determined in a first function block 51 in FIG. 5, as described with reference to FIG. 4. Impedance vectors $Z_n$ which start at the respective oscillation center point $X_0$ and end at the respective impedance value $Z_n$ are calculated for the impedance values $Z_n$ in a following function block 52. The magnitude $|Z_n|$, that is to say the length, is determined for each impedance vector $Z_n$, as well as the angle $\phi_n$ which has been covered since the preceding impedance value $Z_n$.

A check is carried out in a further function block 53 to determine whether the separations between the respective impedance values $Z_n$ and the common oscillation center point $X_0$ remain substantially constant. This is done by determining the ratio $\underline{Z}_k/\underline{Z}_{k-1}$ of the magnitude of the instantaneous impedance vector $\underline{Z}_k$ and the magnitude of the impedance vector $\underline{Z}_{k-1}$ immediately preceding this. If these two magnitudes match, then the result is close to the value 1, for example within the range 0.95 to 1.05. If it is found in the function step 53 that the magnitudes of the impedance vectors $\underline{Z}_k$ and $\underline{Z}_{k-1}$—and therefore also the intervals between the impedance values $Z_n$ and the oscillation center point $X_0$—remain virtually constant, then a first oscillation suspicion signal PV1 is produced, and is supplied to a first input of a logic AND gate.

For data processing purposes, the production of a signal normally means the generation of a so-called "high" signal, that is to say a logic "1", while the non-production or absence of a signal corresponds to a so-called "low" signal or a logic "0". The statements made in this patent application relating to the various signals used for oscillation identification should be understood in this sense.

For simpler calculation, it is also possible to first of all check which of the two magnitudes $\underline{Z}_k$ or $\underline{Z}_{k-1}$ is the greater. A quotient is then formed, with the greater of the two magnitudes in the denominator. In this case, only a single threshold value comparison need be carried out to determine whether the quotient is below a threshold value, since the resultant quotient will always be less than 1. There would then be no need to check a range with an upper and a lower threshold value.

A check is carried out in a further function block 54, which is carried out in parallel with the function block 53, to determine whether the rate of the impedance values on the curve profile remains approximately constant. This is done by considering the respective angles covered, and the difference $|\phi_k - \phi_{k-1}|$ is determined between the instantaneous angle and the angle of the preceding impedance value. If the magnitude of this difference is below a rate threshold value, then the rate of the impedance values on the curve profile remains largely constant, and a second oscillation suspicion signal PV2 is produced, and is supplied to a second input of the AND gate 55.

If both oscillation suspicion signals PV1 and PV2 are present at the inputs of the AND gate 55, then the oscillation identification device 50 produces an oscillation signal P which indicates that an oscillation is present.

In the exemplary embodiment described in FIG. 5, reference is made to individual function blocks (for example function blocks 51, 52, 53, 54) and to logic link modules (for example AND gate 55). Function modules and logic links are not normally in the form of separate circuit units, contrary to the schematic illustration in FIG. 5, but are in the form of software which is processed by a computation device, such as a microprocessor. An embodiment in the form of discrete circuit units is, of course, likewise possible, but is associated with greater complexity. This applies correspondingly to the further exemplary embodiments dealt with in the following text.

Figure 6:
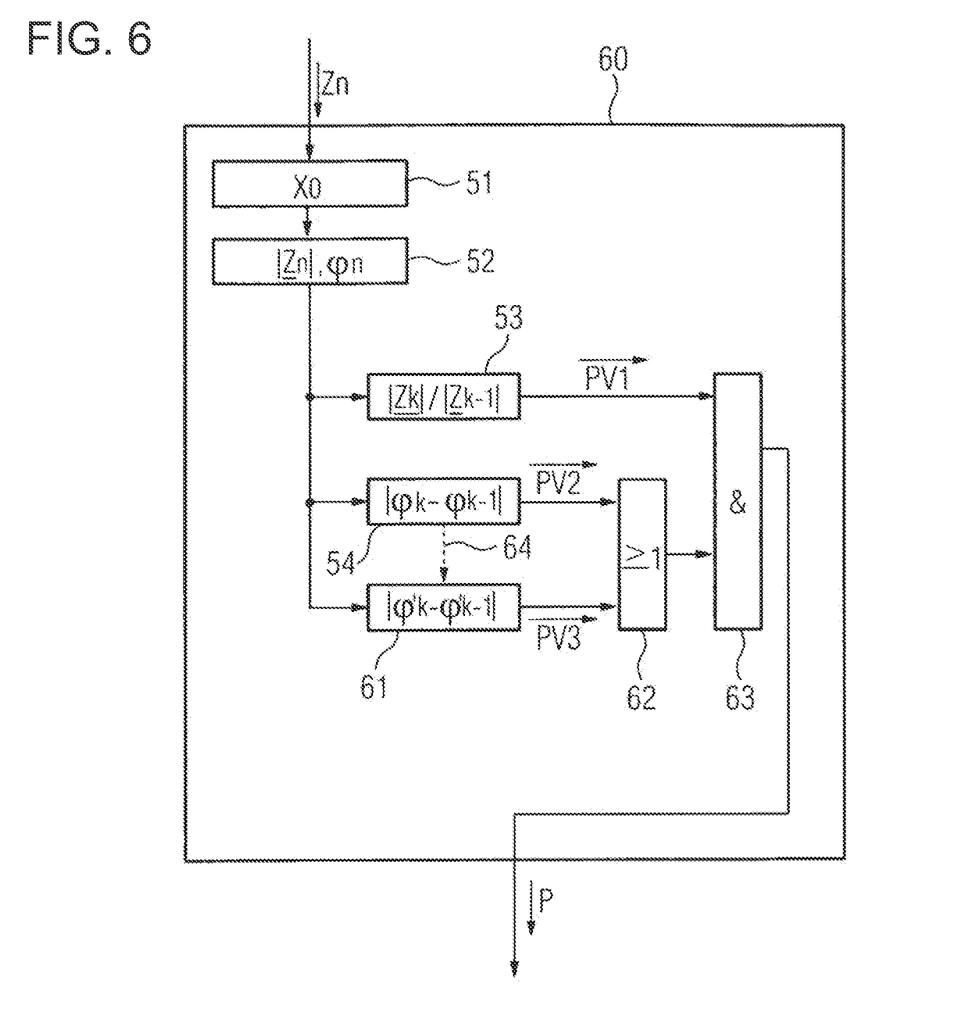
FIG. 6 shows a further block diagram in order to explain a second exemplary embodiment of an oscillation identification device.

FIG. 6 shows a further exemplary embodiment of an oscillation identification device 60. The oscillation identification device 60 reliably also identifies those oscillations for which the rate at which the individual impedance values progress on the curve profile is not constant, but which have a constant (positive or negative) acceleration. This is because a response such as this may also be an indication of an existing oscillation.

Figure 7:
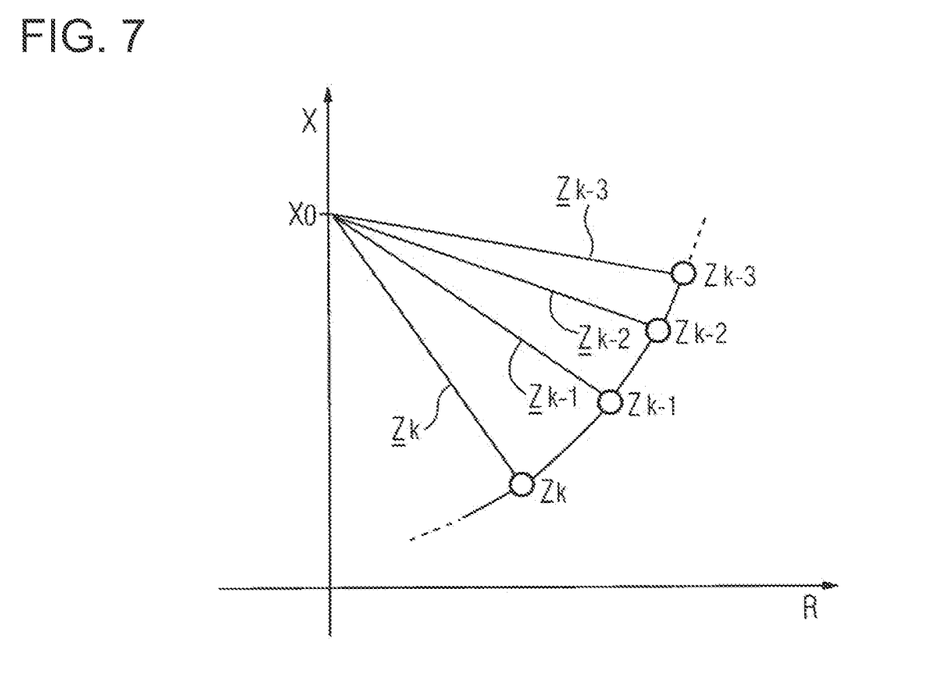
FIG. 7 shows an R-X diagram in order to explain the formation of a third oscillation suspicion signal.

For this purpose, reference will first of all be made to FIG. 7 which once again shows a profile of impedance values $Z_k$ to $Z_{k-3}$ on an R-X diagram, arranged along an approximately elliptical curve profile. As can be seen, the angle covered between two respectively successive impedance values increases continuously (for example the angle between the impedance values $Z_k$ and $Z_{k-1}$ is considerably greater than that between the impedance values $Z_{k-2}$ and $Z_{k-3}$). The increase in angle takes place in a uniform form, however, which means that the angular acceleration of the impedance vectors $\underline{Z}_k$ to $\underline{Z}_{k-3}$ is constant.

Since the situation in which the angular acceleration is constant may also indicate an oscillation, a further function block 61 has been provided as shown in FIG. 6, which is carried out in parallel with the function blocks 53 (constant separation from the oscillation center point $X_0$) and 54 (constant angle rate) which are already known from FIG. 5. This newly added function block 61 checks whether the angular acceleration is virtually constant. This is done by forming the derivative with respect to time of the angle rate (or of the angle $\phi$ covered), and a third oscillation suspicion signal PV3 is produced if this difference is below an acceleration threshold value, and the angular acceleration is therefore virtually constant.

The third oscillation suspicion signal PV3 is applied to an input of an OR gate 62. The other input of the OR gate 62 is supplied with the oscillation suspicion signal PV2 produced in the function step 54. The output of the OR gate 62 is supplied to the input side of an AND gate 63, to whose other input the oscillation suspicion signal PV1 is supplied. The oscillation signal P is therefore emitted from the oscillation identification device 60 when the first and the second oscillation suspicion signals PV1 and PV2 or the first and the third oscillation suspicion signals PV1 and PV3 are present.

In order to limit the required computation capacity and the increase in the reaction rate before a decision can be made about the oscillation signal P, it is also possible for the function block 61 to be activated only when the second oscillation suspicion signal PV2 is not produced, that is to say when the angle rate does not remain the same. In this case, as indicated by an arrow 64, the function block 61 is activated by the function block 54 when the second oscillation suspicion signal PV2 is not present, while it remains deactivated when the oscillation suspicion signal PV2 is present.

Figure 8:
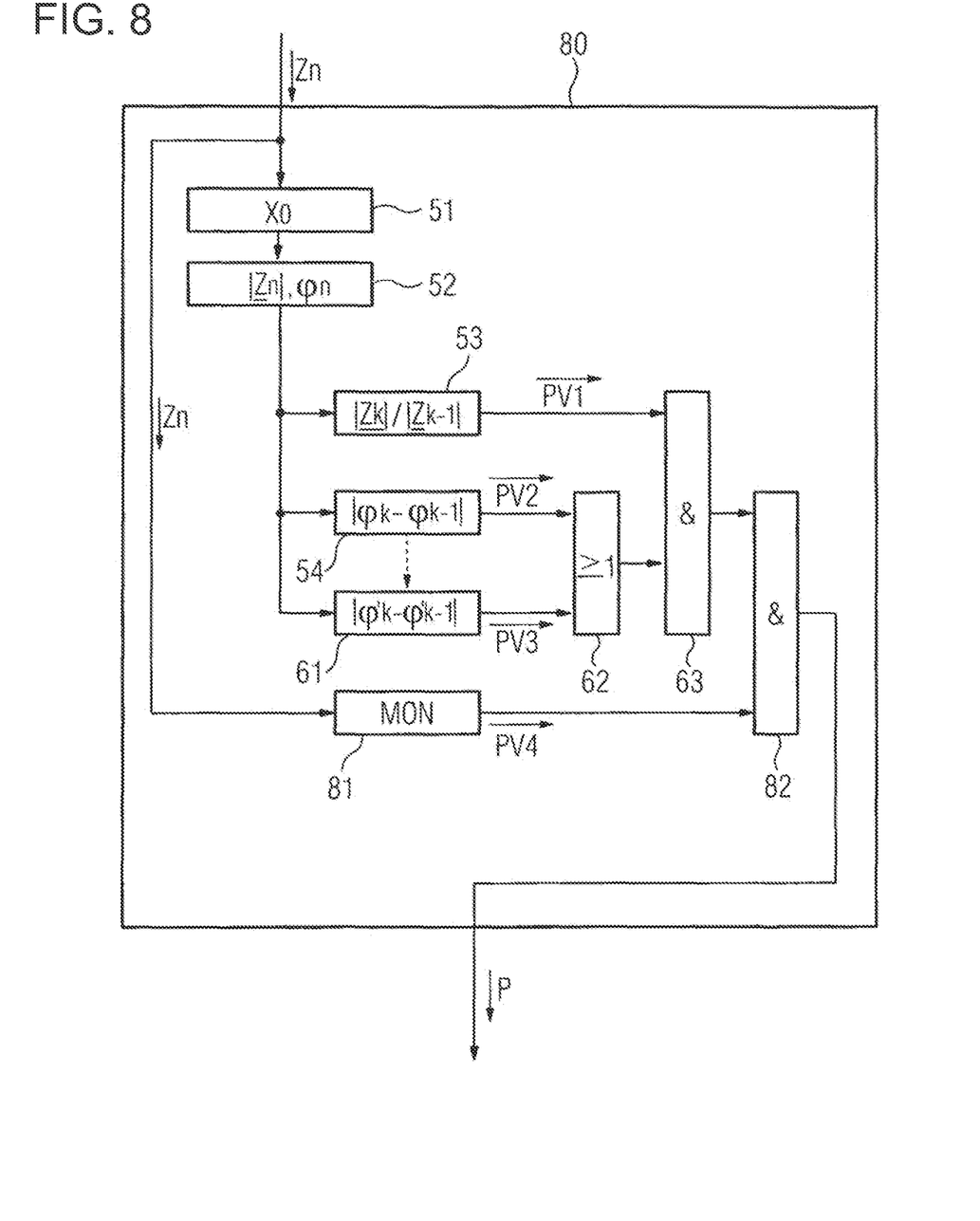
FIG. 8 shows a further block diagram in order to explain a third exemplary embodiment of an oscillation identification device.

FIG. 8 shows a further exemplary embodiment of an oscillation identification device 80 by means of which even more reliable oscillation identification can be carried out. The oscillation identification device 80 differs from the oscillation identification device 60 as shown in FIG. 6 by having a further function block 81, in which the impedance values Z, are checked for a monotonic response. This check determines whether the imaginary part or the real part of the impedance values is falling or rising monotonally, and a fourth oscillation signal PV4 is produced if at least the real part or the imaginary part has a monotonic response.

The fourth oscillation suspicion signal PV4 is supplied to a further AND gate 82, to whose input the output of the AND gate 63, which has already been shown in FIG. 6, is passed. As shown in FIG. 8, an oscillation signal P is emitted from the oscillation identification device 80 when the first, second and fourth or the first, third and fourth oscillation suspicion signals are present. The aim of checking the real part or imaginary part of the monotonic response is to identify excessive fluctuation of the impedance values, which would indicate that there is no oscillation, possibly preventing production of an oscillation signal.

Figure 9:
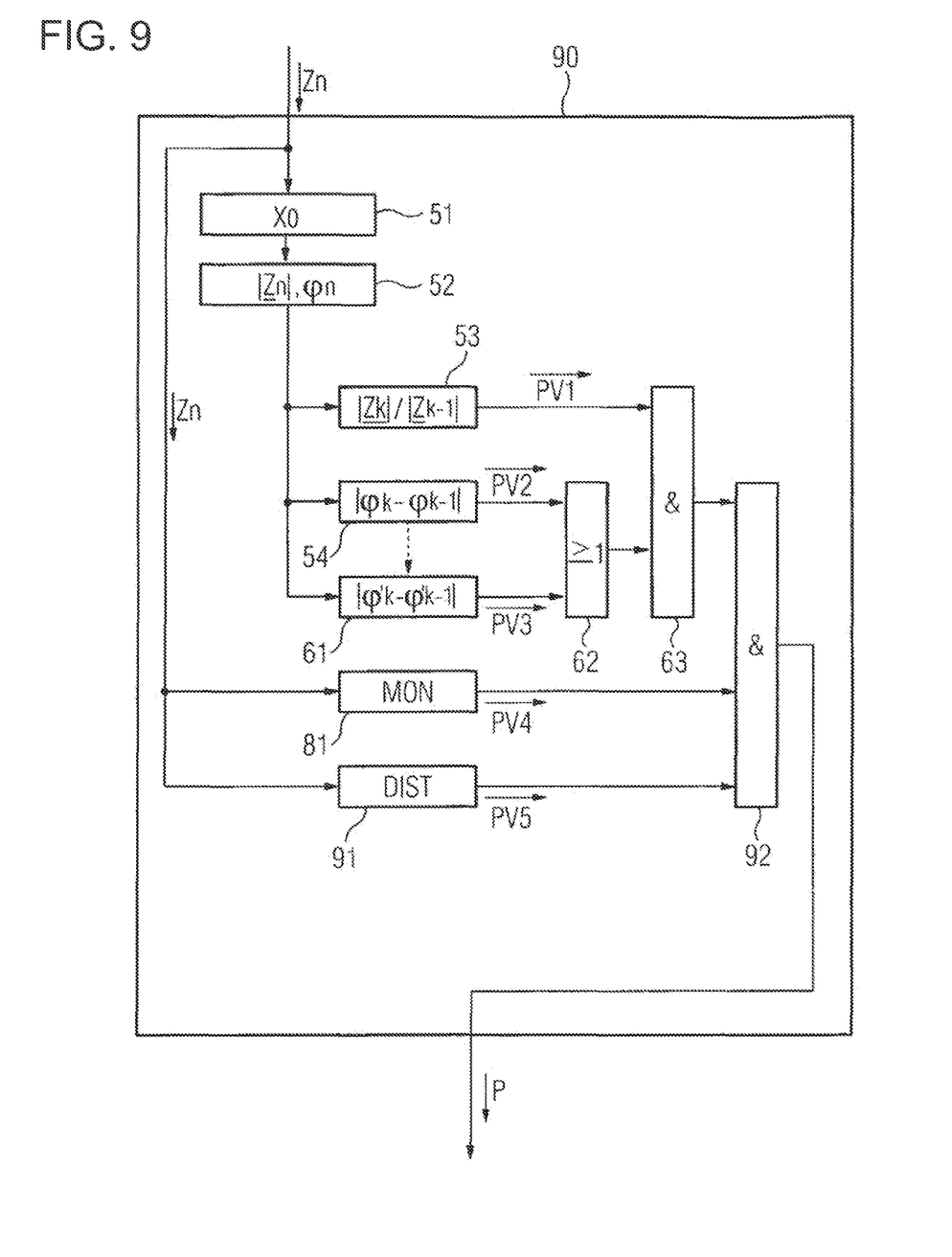
FIG. 9 shows a further block diagram in order to explain a fourth exemplary embodiment of an oscillation identification device.

FIG. 9 shows a further exemplary embodiment with an oscillation identification device 90. The oscillation identification device 90 differs from the oscillation identification device 80 shown in FIG. 8 by having a further function block 91, in which a check is carried out for continuous movement of the impedance values $Z_n$. In this case, the check determines whether the real parts or imaginary parts exceed a minimum separation between the individual impedance values $Z_n$. This is because, if the impedance values $Z_n$ are too close to one another, then this is an indication against oscillation and, in fact, of a relatively stable fault, for which impedance values $Z_n$ are determined with an approximately constant value.

If continuous movement of the impedance values $Z_n$ is found in the function block 91, then a fifth oscillation suspicion signal PV5 is produced, and is supplied to an AND gate 92. The fourth oscillation suspicion signal and the output of the AND gate 63 (cf. FIG. 6) are also applied to the AND gate 92. The oscillation identification device 90 therefore emits an oscillation signal P when either the first, second, fourth and fifth or first, third, fourth and fifth oscillation suspicion signals are present.

Figure 10:
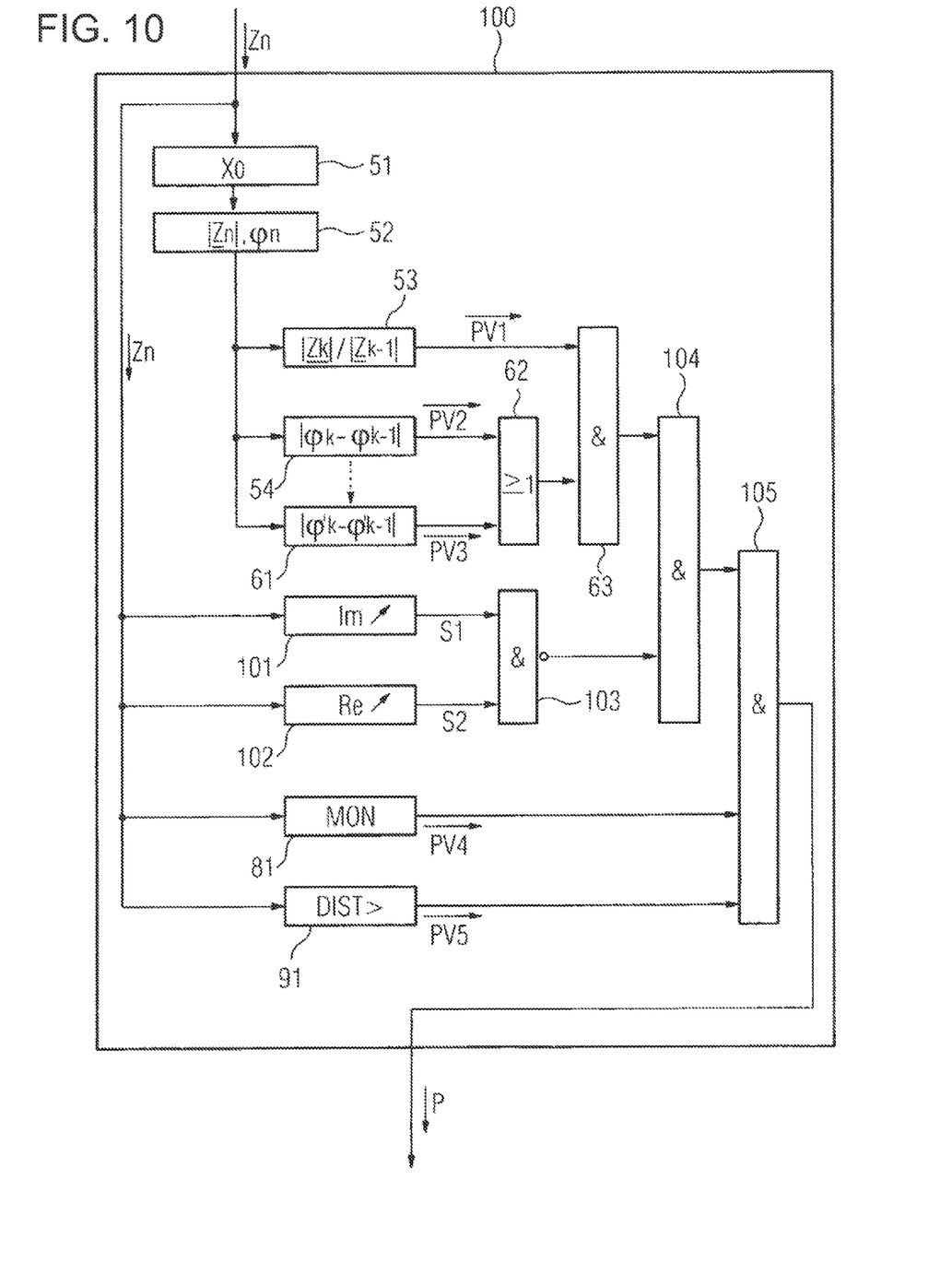
FIG. 10 shows a further block diagram in order to explain a fifth exemplary embodiment of an oscillation identification device.

FIG. 10 shows a final exemplary embodiment of an oscillation identification device 100. The oscillation identification device 100 additionally checks whether the curve profile described by the impedance values $Z_n$ has any sudden changes. A function block 101 is provided for this purpose, and checks whether there is a sudden change in the imaginary part of two successive impedance values $Z_n$. A sudden change such as this can be detected, for example, if the change in the imaginary parts of two successive impedance values exceeds a fixed predetermined threshold, or a threshold which is dynamically matched to the previous profile of the impedance values. If the function block 101 finds there is a sudden change in the imaginary part between two successive impedance values, then a first sudden change signal S1 is emitted to an input of a so-called NAND gate 103.

A further function bock 102 carries out a corresponding check on the real parts of two successive impedance values, and emits a second sudden change signal S2 to the NAND gate 103 if a sudden change has been found between the real parts of two successive impedance values.

The NAND gate 103 emits an output signal when and only when none or a maximum of one of its inputs is at logic high, that is to say when at most the first or the second sudden change signal S1 or S2 has occurred. In this case, the NAND gate 103 emits an output signal to the input of an AND gate 104, to whose further input the output of the AND gate 63 is applied (cf. FIG. 6). If the AND gate 104 receives an input signal at both of its inputs, then it only emits an output signal to an AND gate 105, to whose further inputs the oscillation suspicion signals PV4 and PV5, which have already been dealt with in FIGS. 8 and 9, are applied.

The oscillation suspicion device 100 emits an oscillation signal P on the output side when an input signal is applied to each input of the AND gate 105.

In summary, a check is therefore carried out in the exemplary embodiment shown in FIG. 10 to determine whether the curve profile described by the impedance values $Z_n$ has a sudden-change response. If a sudden change is detected which affects both the imaginary part and the real part of two successive impedance values, then this indicates a fault, and no oscillation signal P must be emitted. In this case, the NAND gate 103 does not emit an output signal, since both the first and the second sudden change signals S1 and S2 are applied to it. In consequence, the AND gate 104 does not produce an output signal, which also prevents the AND gate 105 from emitting an output signal.

However, if only the first or only the second sudden change signal S1 or S2 is present, this means that only the imaginary part or only the real part has been affected by the identified sudden change between two successive impedance values, and an oscillation signal can nevertheless be produced if the other oscillation suspicion conditions are present.

A sudden change such as this affecting only the imaginary part or only the real part may occur, for example, at a point of inflection (that is to say right at the top and bottom or at the extreme right or left) of the elliptical curve profile through which the impedance values $Z_n$ pass. By way of example, the imaginary components of successive impedance values change only marginally at the lower point of inflection, while the real components of successive impedance values have a greater change. Since, however, only one elliptical curve profile which is normal for oscillations is described in this case, this also indicates an oscillation, and an oscillation signal must not be suppressed.

If there are no sudden changes affecting either the imaginary part or the real part, then the oscillation signal must likewise not be suppressed.

Figure 11:
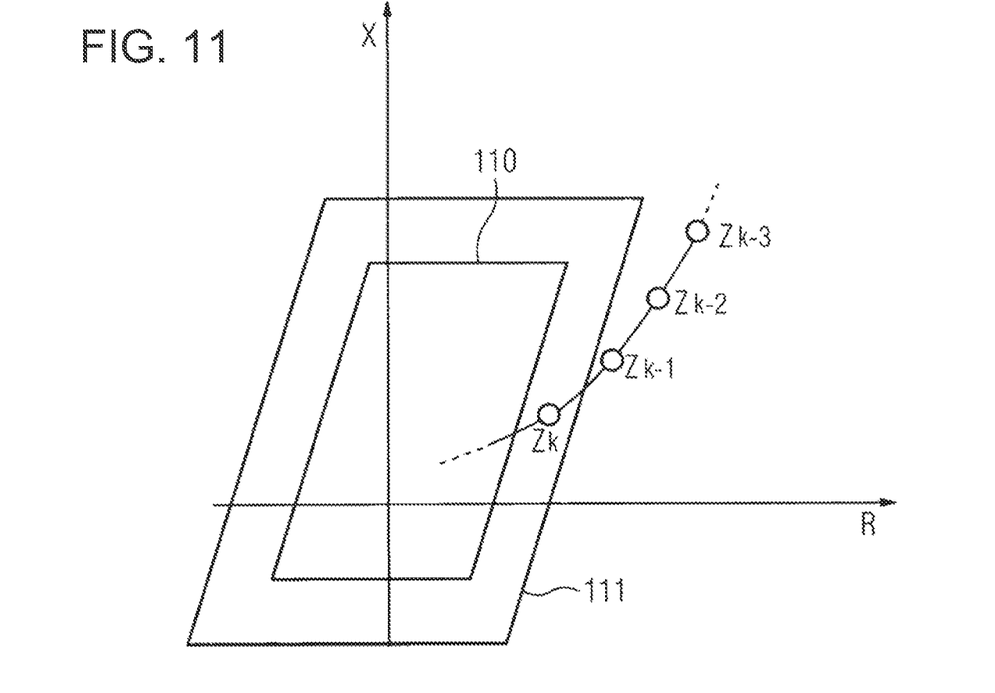
FIG. 11 shows an R-X diagram, showing a tripping polygon and an oscillation polygon.

Finally, FIG. 11 shows a sequence of successive impedance values $Z_k$ to $Z_{k-3}$ on an R-X diagram. FIG. 11 also shows a tripping polygon 110 which is used to carry out distance protection. As already explained in conjunction with FIG. 2, the distance protection algorithm is set such that a tripping signal is emitted to a circuit breaker when an impedance value enters the tripping polygon, provided that this tripping signal is not suppressed by an oscillation signal of an oscillation identification device. FIG. 11 furthermore shows a so-called oscillation polygon 111 which is formed at some distance (for example at a distance of $5\Omega$) around the tripping polygon. The purpose of the oscillation polygon 111 is to allow the output of an oscillation signal, which is normally also emitted in the form of a message indicating an oscillation to the operator of the electrical power supply system, only when the first impedance value has entered the oscillation polygon. The aim of this is to suppress an unnecessary confusing output of oscillation messages to the operator of an electrical power supply system, since oscillations which take place at a sufficiently great distance from the tripping polygon 110 do not represent a danger, and are also irrelevant for carrying out the distance protection function.

In summary, the explained exemplary embodiments describe a number of possible ways to analyze characteristic features of a curve profile which is described by impedance values, to determine whether they indicate a normal behavior in the case of oscillations or in fact indicate a fault in the electrical power supply system. If characteristic features of a curve profile which occurs in the event of an oscillation are discovered, then an oscillation signal may be produced corresponding to a logic link between corresponding signals, preventing a tripping signal from being emitted by a distance protection device, in order not to isolate the relevant parts of the system from the rest of the system in the event of a system oscillation which is in principle in fact not dangerous.

The invention claimed is:

1. A method for producing an oscillating signal that indicates an oscillation in an electrical power supply system, the method which comprises:
   detecting measured values that characterize a current and a voltage at a measurement point in the electrical power supply system and converting the measured values to digital current vector measured values and voltage vector measured values;
   calculating impedance values in the complex number domain from the current vector measured values and the voltage vector measured values; and
   considering a curve profile formed by the impedance values and
     producing a first oscillation suspicion signal if a separation of the impedance values from an oscillation center point remains substantially constant;
     producing a second oscillation suspicion signal if a rate at which the impedance values progress on the curve profile remains substantially constant; and producing the oscillation signal if both the first and the second oscillation suspicion signals are present.

2. The method according to claim 1, wherein the first oscillation suspicion signal is produced by:
- determining an impedance vector which originates from the oscillation center point for each of the impedance values which lie on the curve profile; and
- calculating the magnitude of the respective impedance vector, and producing the first oscillation suspicion signal if a ratio of the magnitudes of two immediately successive impedance vectors lies within a predetermined range around the value 1.

3. The method according to claim 1, wherein the second oscillation suspicion signal is produced by:
- determining an impedance vector which originates from the oscillation center point for each of the impedance values which lie on the curve profile;
- determining an angle rate for an instantaneous impedance vector and an immediately preceding impedance vector; and
- producing the second oscillation suspicion signal if the difference between the angle rates is less than a predetermined rate threshold value.

4. The method according to claim 3, which comprises in each case considering the angle between the impedance vector and the immediately preceding impedance vector in order to determine the angle rate.

5. The method according to claim 1, which further comprises:
- producing a third oscillation suspicion signal if an acceleration with which the impedance values progress on the curve profile remains substantially constant; and
- also producing the oscillation signal when the first oscillation suspicion signal and the third oscillation suspicion signal are present.

6. The method according to claim 5, which comprises producing the third oscillation suspicion signal if only the first oscillation suspicion signal is present.

7. The method according to claim 5, wherein the third oscillation suspicion signal is produced by:
- determining an impedance vector which originates from the oscillation center point for each of the impedance values lying on the curve profile;
- determining an angular acceleration for the instantaneous impedance vector and the immediately preceding impedance vector; and
- producing the third oscillation suspicion signal if a difference between the angular accelerations is less than a predetermined acceleration threshold value.

8. The method according to claim 1, wherein the oscillation center point is determined by:
- determining partial center points in each case for the instantaneous impedance value and a number of immediately preceding impedance values;
- removing those partial center points with the largest and the smallest imaginary parts; and
- determining the oscillation mean value as an arithmetic mean from the remaining partial center points.

9. The method according to claim 8, which comprises determining the oscillation center point from the remaining partial center points only if a standard deviation of the distribution of the partial center points lies below a predetermined plausibility threshold value.

10. The method according to claim 8, which comprises determining the partial center points by way of a least-squares estimation process.

11. The method according to claim 1, which further comprises:
- producing a fourth oscillation suspicion signal if the curve profile exhibits a monotonic behavior; and
- producing the oscillation signal only if the fourth oscillation suspicion signal is also present.

12. The method according to claim 1, which further comprises:
- producing a fifth oscillation suspicion signal if the interval between two immediately successive impedance values exceeds a predetermined interval threshold value; and
- producing the oscillation signal only if the fifth oscillation suspicion signal is also present.

13. The method according to claim 1, which further comprises:
- producing a first sudden-change signal if a sudden change is identified between the imaginary parts of two immediately successive impedance values;
- producing a second sudden-change signal if a sudden change is identified between the real parts of two immediately successive impedance values;
- producing the oscillation signal if only one of the two sudden-change signals is present and, at the same time, the first oscillation suspicion signal and the second oscillation suspicion signal are present; or
- the first oscillation suspicion signal and the third oscillation suspicion signal are present; and
- blocking the oscillation signal if the first sudden-change signal and the second sudden-change signal are present.

14. The method according to claim 1, which further comprises:
- carrying out a distance protection method using the impedance values; and
- blocking the production of a tripping signal by way of the distance protection method when the oscillation signal is present.

15. The method according to claim 14, which comprises:
- when carrying out the distance protection method, checking the impedance values to determine whether the impedance values lie within a predetermined tripping polygon; and
- emitting the oscillation signal only if at least the instantaneous impedance value lies within an oscillation polygon enclosing the tripping polygon.

16. An electrical protection device or measurement instrument for monitoring an electrical power supply system, comprising:
- a measured-value detection and preprocessing device for acquiring and processing measured values that characterize a current and a voltage at a measurement point in the power supply system;
- a control device for processing the measured values; and
- an oscillation identification device configured to carry out the method according to claim 1.

* * * * *